United States Patent Office 2,977,335
Patented Mar. 28, 1961

2,977,335
COMPOSITION OF MATTER COMPRISING A VINYLIDENE CHLORIDE COPOLYMER AND A PLASTICIZER

Carl B. Havens, Midland, Mich., assignor to The Dow Chemical Company, Midland, Mich., a corporation of Delaware No Drawing. Filed Jan. 12, 1959, Ser. No. 786,025
3 Claims. (Cl. 260—32.8)

This invention relates to new organic compounds and to polymeric compositions containing the same. More particularly, it relates to new organic compounds finding utility as plasticizers for haloethylene polymers.

This application is a continuation-in-part of U.S. Serial No. 544,817, filed November 3, 1955, now abandoned.

Thermoplastic compositions, particularly those prepared from haloethylene polymers, have found wide acceptance as useful materials for making foils, fibers, filaments, and other articles. The articles so produced are inherently strong, dimensionally stable, relatively inert to common household solvents, and are easily colored for an attractive appearance. However, it is necessary to plasticize those polymers to lower the melt or flow viscosity of the polymer so that they may be forced through dies or into molds. It is impossible to predict the plasticizing efficiency of any compound merely from its structure and physical properties. A plasticizer must have a limited solvency for the polymer and still be compatible with the polymer. It must provide a polymer-plasticizer mixture which has a molten flow viscosity which is much less than the molten flow viscosity of the polymer alone, and yet retain much of the strength due to the polymer.

It is therefore a principal object of this invention to provide new organic compounds having the stated utility.

It is a further object to provide plasticized polymeric compositions from such compounds and haloethylene polymers.

The above and related objects are accomplished by means of a group of compounds having the general formula:

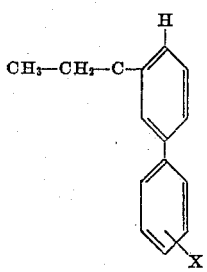

wherein X is selected from the group consisting of hydrogen, chlorine, bromine, and alkyl of from 1 to 4 carbon atoms. As typical examples of the compounds contemplated in this invention may be mentioned:

2-hydroxy-5-phenyl propiophenone
2-hydroxy-5-(p-chlorophenyl)propiophenone
2-hydroxy-5-(p-bromophenyl)propiophenone
2-hydroxy-5-(p-tert.butylphenyl)propiophenone The compounds are easily prepared by the rearrangement of the corresponding propionic acid ester of the phenylphenol. Typically, 105 parts of 4-phenyl phenyl propionate were dissolved in 450 parts of tetrachloroethane. 75 parts of aluminum chloride were added portionwise and the mixture was refluxed for 2 hours. The reaction mixture was then allowed to cool overnight and was poured into a stirred excess of ice and HCl. The organic layer was washed with water and the solvent removed by distillation. The product was distilled under reduced pressure and recrystallized from alcohol. The product was in the form of pale yellow crystals which melted at 91.7° C.

The compounds of this invention may be used in polymer compositions containing other inert ingredients, such as heat and light stabilizers, fillers and pigments. Although the compositions may be mixed by known blending procedures, some care must be exercised to prevent the formation of the inorganic salts of the compounds of this invention. Such inorganic salts are highly colored and act as pigments, themselves.

The compounds were found to be effective plasticizers for haloethylene polymers, particularly those prepared from vinylidene chloride and vinyl chloride containing a predominating, that is at least 50 percent by weight, amount of vinylidene chloride. The normally crystalline copolymers of vinylidene chloride and vinyl chloride, which are those containing at least 70 percent vinylidene chloride, are preferred subject materials for plasticization herein. These normally crystalline copolymers represent an unusually difficult plasticizing problem. When employed in the usual plasticizing amounts of from about 5 to 15 percent by weight the melt viscosity of the plasticized composition was appreciably below that of the polymer alone. The compounds were compatible with such polymers and did not bleed out of the composition. When the compositions were molded or extruded, the products were clear.

The effectiveness of the compounds as plasticizers for the haloethylene polymers will be more apparent from the following illustrative example in which all parts are by weight.

*Example*

Two compositions were prepared based on a copolymer prepared from 85 percent by weight of vinylidene chloride and 15 percent by weight of vinyl chloride. Composition A consisted of only the copolymer while Composition B consisted of 90 percent by weight of copolymer intimately mixed with 10 percent by weight of 2-hydroxy-5-phenyl propiophenone. Composition A was found to have a melt viscosity of 23,250 poises and Composition B had a melt viscosity of 6,500 poises. When both compositions were molded into strips, the strip from Composition A was hard and brittle whereas the strip from Composition B was clear, tough, and flexible.

Similarly advantageous results are obtained when 2-hydroxy- 5 -(p-chlorophenyl)propiophenone and 2-hydroxy-5-(p-tert.butylphenyl)propiophenone are used as plasticizers in compositions containing vinylidene chloride-vinyl chloride copolymers wherein the vinylidene chloride is present in amount of 50 percent or more usually in amounts of from 5 to 15 percent of the weight of the composition.

I claim:

1. A composition of matter comprising (1) a copolymer of vinylidene chloride and vinyl chloride containing at least 50 percent by weight of vinylidene chloride copolymerized therein, and (2) from 5 to 15 percent by weight based on the weight of said copolymer of a compound having the general formula:

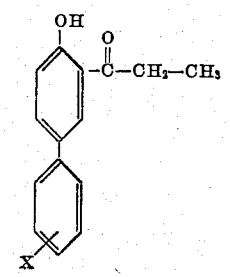

wherein X is selected from the group consisting of hydrogen, chlorine, bromine, and alkyl of from 1 to 4 carbon atoms.

2. The composition of claim 1 wherein said copolymer is a normally crystalline copolymer of vinylidene chloride and vinyl chloride containing at least 70 perecent by weight of vinylidene chloride copolymerized therein.

3. The composition claimed in claim 1, wherein said compound is 2-hydroxy-5-phenyl propiophenone.

No references cited.

UNITED STATES PATENT OFFICE
CERTIFICATION OF CORRECTION

Patent No. 2,977,335 — March 28, 1961

Carl B. Havens

It is hereby certified that error appears in the above numbered patent requiring correction and that the said Letters Patent should read as corrected below.

Column 1, lines 43 to 53, the formula should appear as shown below instead of as in the patent:

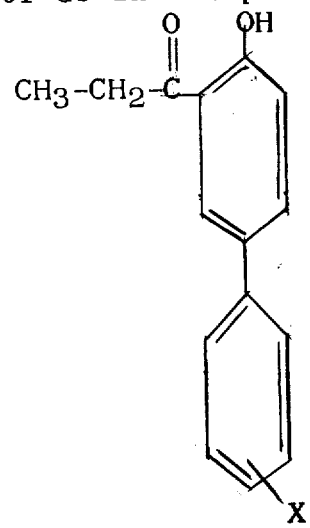

Signed and sealed this 14th day of November 1961.

(SEAL)
Attest:

ERNEST W. SWIDER
Attesting Officer

DAVID L. LADD
Commissioner of Patents